United States Patent [19]
Murata et al.

[11] Patent Number: 5,983,657
[45] Date of Patent: Nov. 16, 1999

[54] AIR CONDITIONING SYSTEM

[75] Inventors: Yoshinori Murata, Kariya; Hisayoshi Sakakibara, Nishio; Shin Nishida; Yasutaka Kuroda, both of Anjo, all of Japan

[73] Assignee: Denso Corporation, Kariya, Japan

[21] Appl. No.: 09/013,345

[22] Filed: Jan. 26, 1998

[30] Foreign Application Priority Data

Jan. 30, 1997 [JP] Japan ..................... 9-016957

[51] Int. Cl.$^6$ ................................ F25B 1/00
[52] U.S. Cl. ............... 62/228.3; 62/129; 62/205; 62/206
[58] Field of Search .................. 62/228.3, 129, 62/126, 206, 205, 149

[56] References Cited

U.S. PATENT DOCUMENTS

| | | | |
|---|---|---|---|
| 2,331,264 | 10/1943 | Carter | 62/8 |
| 4,966,013 | 10/1990 | Wood | 62/193 |
| 5,152,151 | 10/1992 | Jarosch | 62/115 |
| 5,333,468 | 8/1994 | Rice | 62/174 |
| 5,457,965 | 10/1995 | Blair et al. | 62/129 |
| 5,564,280 | 10/1996 | Schilling et al. | 62/84 |

FOREIGN PATENT DOCUMENTS 54-62137  10/1977  Japan.
58-54904   4/1983  Japan.

*Primary Examiner*—Henry Bennett
*Assistant Examiner*—Marc Norman
*Attorney, Agent, or Firm*—Harness, Dickey & Pierce, PLC

[57] ABSTRACT

An air conditioning system having an evaporator 8 at a location upstream from a compressor. When a compressor is stopped, a refrigerant inlet is closed by an electromagnetic valve 28 and a refrigerant outlet is closed by a check valve 29. A pressure in the closed passageway is detected by a pressure sensor 22. A leakage of refrigerant at the evaporator is reliably detected, which allows the leakage of the refrigerant to be quickly noticed.

6 Claims, 4 Drawing Sheets

AIR CONDITIONING SYSTEM

BACKGROUND OF THE INVENTION

1. Field of the Invention

The present invention relates to an air conditioning system provided with a device for detecting leakage of refrigerant from a heat exchanger, such as an evaporator, arranged in a chamber to be subjected to an air conditioning. The present invention is particularly suitable for an air conditioning system wherein, as a refrigerant, a combustible fluid, such as propane or butane, or a toxic fluid such as a carbon dioxide or ammonia, is employed.

2. Description of Related Art

An air conditioning system which is provided with means for preventing a refrigerant from leaking is shown, for example, in the Japanese Unexamined Utility Model Publication No. 54-62137. In this prior art, detection of the leakage of the refrigerant is done based on a pressure change at the high pressure side of the refrigerating system constructing the air conditioning system.

In such an air conditioning system utilizing, as the refrigerant, a combustible fluid or carbon dioxide, it is necessary that any leakage of the refrigerant from heat exchanging parts in the cabin, such as an evaporator, is detected very quickly. A quick detection of leakage of refrigerant from parts in the cabin cannot, however, be executed in the prior art since detection of the leakage of the refrigerant, by the pressure change at the high pressure part (condenser) makes it difficult to identify a particular part at which the leakage of the refrigerant is actually occurring.

Japanese Unexamined Utility Model Publication No. 58-54904 discloses a gas sensor, for detecting leakage of a gas, which is arranged in a cabin or an air conditioning apparatus. However, this prior art is, also, disadvantageous in that a quick detection of the leakage of the refrigerant is not possible due to the following reason. Namely, although not described in a detailed manner in the 904 publication, the gas sensor is generally of a contact combustion type, where an existence of a gas is detected in accordance with the degree of an oxidation of the gas to be detected. In this contact combustion type gas sensor, it is necessary to increase the temperature of the sensor part to a temperature which is suitable for an oxidation of the gas and which is in a range between 250 to 300° C. in case of a combustible fluid. Thus, any detection of the existence of the gas, i.e., an occurrence of the leakage of the gas can not be done until the gas temperature is increased to a temperature in the above range.

Furthermore, the location of the gas sensor must be suitably determined while considering various situations such as a difference in the density between the refrigerant and the air and the flow of the air. Namely, a non suitable location of the gas sensor may cause, irrespective of a fact that a leakage of the gas has actually occurred, the sensor to not detect the occurrence of the leakage of the gas in good time.

SUMMARY OF THE INVENTION

An object of the present invention is to provide an air conditioning system capable of overcoming the above mentioned difficulties in the prior art.

Another object of the present invention is to provide an air conditioning system capable of quickly detecting the occurrence of a gas leakage from an appliance which is in contact with the air discharged into a cabin.

The present invention features in a first valve means for closing a refrigerant passageway at a location upstream from the inlet of the refrigerant to the heat exchanger during a stoppage of the compressor, a second valve means for closing the refrigerant passageway at a location downstream from the outlet of the heat exchanger during a stoppage of the compressor, and a pressure detecting means for detecting the pressure of the refrigerant and arranged in the refrigerant passageway at a location between said first and second valve means.

In this structure, during the stopped condition of the compressor, refrigerant, in the parts of the refrigerant system in the chamber to be air conditioned including the heat exchanger, is under a sealingly closed condition and the pressure sensor detects the pressure of the sealingly closed refrigerant. As a result, a change in the pressure of the sealingly closed refrigerant is detected, so that any leakage of the refrigerant from the parts of the refrigerating system in the chamber to be air conditioned is positively and quickly detected.

Preferably, the compressor is brought into a stopped condition when the pressure sensed by the pressure detecting means is smaller than a predetermined value. Furthermore, preferably, said pressure detecting means comprise a pressure switch having contacts which are selectively operated by mechanically detecting the pressure of the refrigerant. As a result of this structure, unlike the electrical sensor, no supply of an electric power is necessary to detect the pressure. Thus, a positive detection of the leakage of the refrigerant is possible without being interrupted. As a result, a reliable pressure sensing operation can be expected.

DESCRIPTION OF PREFERRED EMBODIMENTS

DESCRIPTION OF A PREFERRED EMBODIMENT

Now, an embodiment of the present invention will be explained with reference to the attached drawings.

Figure 1:
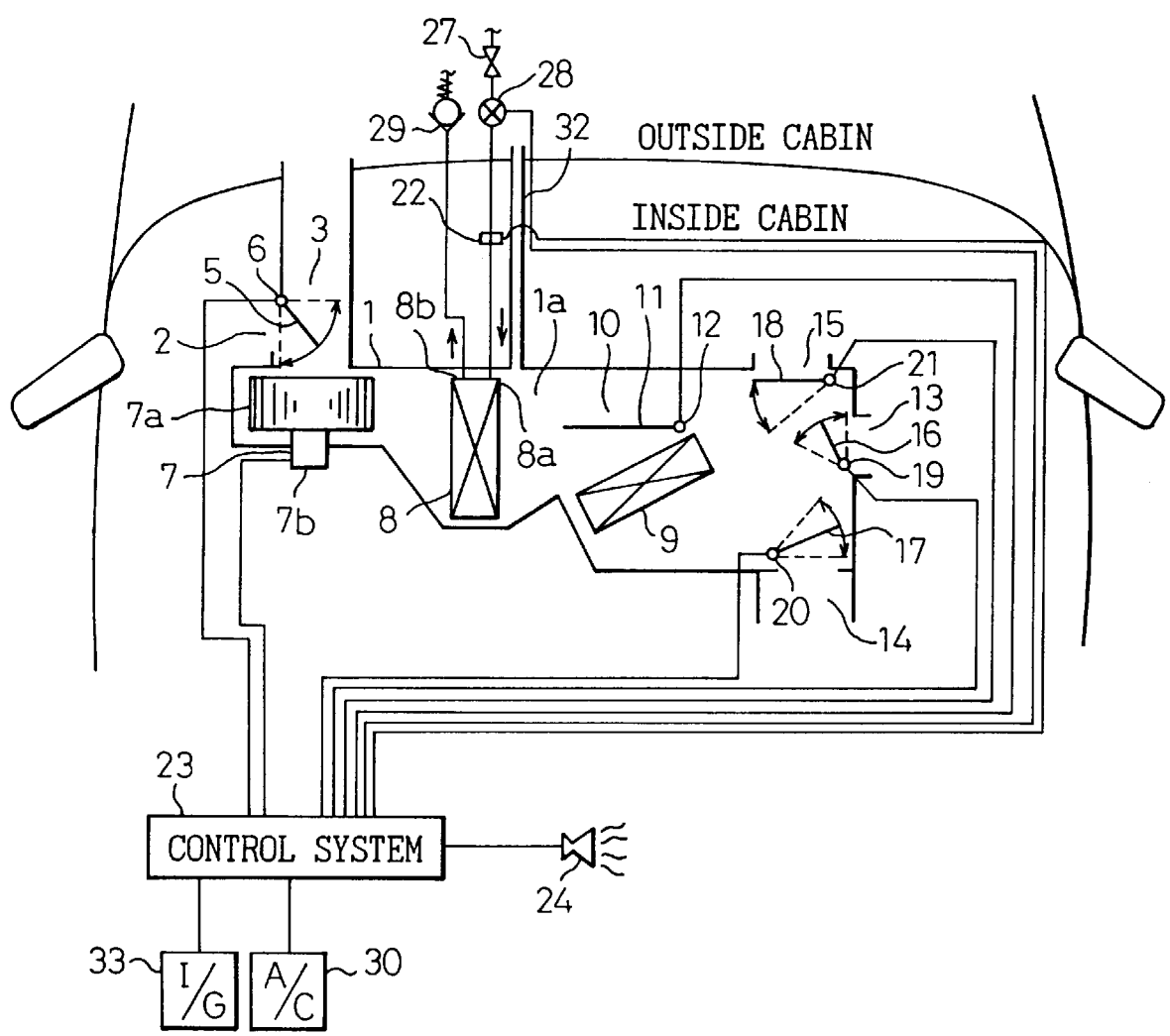
FIG. 1 is a schematic view of the air conditioning system for a vehicle according to an embodiment of the present invention.

In FIG. 1, showing a schematic entire view of an air conditioning system for a vehicle according to the present invention, reference numeral 1 denotes a casing which has a passageway 1a for a flow of air for an air conditioning. The casing 1 is, at its upstream end, formed with an inside air inlet 2 for an introduction of an air from the cabin and an outside air inlet 3 for an introduction of an air flow from the outside atmosphere. A switching door 5 is arranged inside the casing 1 so that the door 5 can moved between a first position where the inside air inlet 2 is opened while the outside air inlet 3 is closed and a second position where the inside air inlet 2 is closed while the outside air inlet 3 is opened. The switching door 5 is connected to a drive means 6, such as a servo-motor for obtaining a movement of the switching door between the first and the second positions.

A reference numeral 7 is a blower, which is constructed by a sirocco fan 7a located in the air passageway 1a at a location downstream from the switching door 5 and an electric motor 7b as a driving means drivingly connected to the fan 7a so that the fan 7a is rotated. The rotating speed of the fan 7a is controlled in accordance with the voltage applied to the blower motor 7b.

An evaporator 8 as a heat exchanger, which is connected to a refrigerating system as fully described later, is arranged in the air passageway 1a at a location downstream from the fan 7a, so that a heat exchange can occur between a refrigerant passing through the evaporator 8 and the air in the passageway 1a contacting with the heat exchanger 8. A drain pipe 32 is, at its one end, connected to the casing 1 so that the pipe 32 is opened to the air passageway 1a at a location downstream from the evaporator 8. The other end of the drain pipe 32 is opened to the atmosphere outside the cabin. A heater core 9 is arranged in the air passageway 1a at a location downstream from the drain pipe 32 for heating the air flowing in the air passageway 1a. In a well known manner, the heater core 9 is connected to a system for recirculating a cooling water from an internal combustion engine as a heating source. A by-pass passageway 10 by-passing the heater core 9 is formed on one side of the heater core 9.

An air mix door 11 is arranged, in the air passageway 1a, at a location upstream from the heater core 9. The air mix door 11 can move between a first position where the heater core 9 is opened, while the by-pass passageway 10 is closed and a second position where the by-pass passageway 10 is closed, while the heater core 9 is opened. Furthermore, the air mix door 11 is able to take a desired position intermediate between the first and the second positions, so that a ratio can be varied between the full amount of the air flow passing through the heater core 9 and the full amount of air flow passing through the by-pass passageway 10. In order to adjust the degree of the opening of the air mix door 11, i.e., the value of the air flow ratio, the air mix door 11 is drivingly connected to a drive means 12, such as a servo-motor.

The casing 1 is, at its downstream end, formed with an upper level outlet 13 (face outlet) for discharging an air flow directed to an upper part of a passenger in the cabin, a lower level outlet 14 (foot outlet) for discharging an air flow directed to a lower part of a passenger in the cabin and a defroster outlet 15 for discharging an air flow directed to the inner surface of a wind shield in the cabin. Doors 16, 17 and 18 are arranged so that the outlets 13, 14 and 15 are independently opened or closed. Drive means 19, 20 and 21 are drivingly connected to the doors 16, 17 and 18, respectively. The doors 16, 17 and 18 function as air passageway opening and closing means for a selective connection of the air passageway 1a with the upper, lower and defroster outlets 13, 14 and 15, respectively.

The evaporator 8 is arranged on a refrigerating passageway in which an electromagnetic valve (first valve means) 28 and a check valve (second valve means) 29 are arranged, the constructions of which will be explained in more detail later. A sensor (a pressure detecting means) 22 is arranged in a refrigerating passageway, at a location between the electromagnetic valve and the evaporator 8, to detect a pressure of the refrigerant passing through the evaporator 8. The pressure sensor 22 functions, in cooperation with a control unit 23, to continuously monitor the pressure of the refrigerant in such a manner that, when the pressure of the refrigerant is lowered below a predetermined value, a determination of a leakage of the refrigerant is done, which allows a warning device 24 such as a buzzer or a caution lamp to be brought into an operation, thereby notifying the leakage of the refrigerant to a driver. The warning device 24 is arranged on a location in the cabin such as an instrument panel, which makes it easy for a driver to monitor the warning device 24.

Figure 2:
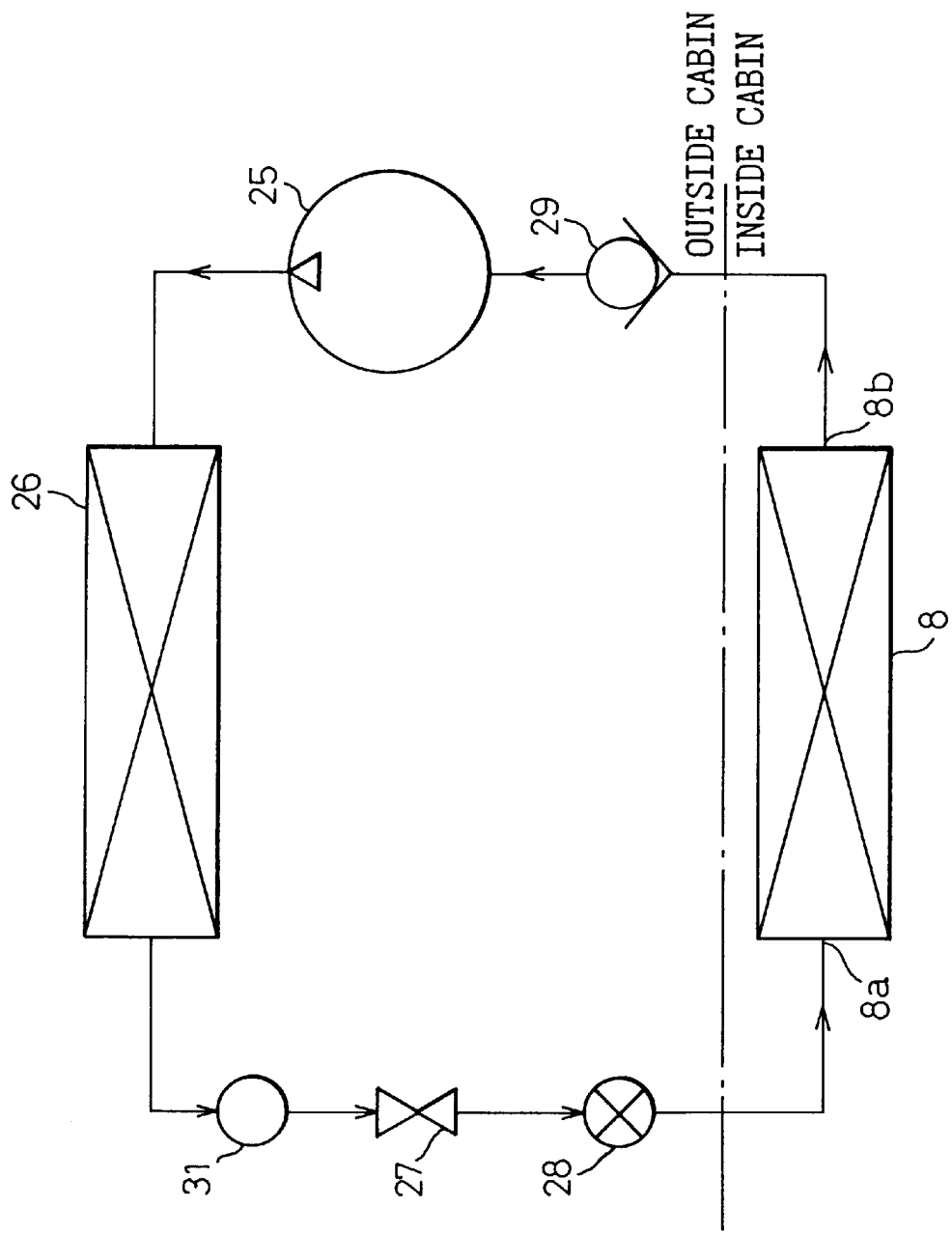
FIG. 2 is a schematic view illustrating a refrigerating system used in the air conditioning system in FIG. 1.

Now, a construction of the refrigerating system will be explained with reference to FIG. 2. The refrigerating system in FIG. 2 is a vapor compression type using, as a refrigerant, a combustible mixture such as a propane gas and includes a compressor 25 which is in a driving connection with a crankshaft (not shown) of an internal combustion via a clutch (not shown). As a result, an engagement of the clutch causes the rotating movement of the crankshaft to be transmitted to the compressor 25, resulting in a compression of the refrigerant. A condenser 26 is arranged downstream from the compressor 25. The condenser 26 is arranged in a front part of an engine compartment of the vehicle. In the case where carbon dioxide is used as a refrigerant, the refrigerant is not condensable. In this case, a heat emitter is used in place of the condenser.

A high pressure switch 31 is arranged in the refrigerant recirculating passageway for detecting the pressure of the refrigerant at a location downstream from the condenser 26. The switch 31 is for preventing the condensed pressure from being abnormally increased, which may otherwise cause the condenser 26 to be damaged. Namely, the switch 31 detects a condition where the pressure inside the condenser 26 is abnormally increased and de-energizes the electromagnetic clutch which is arranged between the crankshaft of the internal combustion engine (not shown) and the compressor 25, which causes the compressor 25 to be stopped, thereby preventing the pressure from being abnormally increased in the condenser 26. Finally, the high pressure switch 31 is of well known type which mechanically detects the pressure of the refrigerant and opens or closes contacts.

In FIG. 2, an expansion valve 27 is arranged in the refrigerating passageway at a location downstream from the condenser 26. In a well known manner, the expansion valve 27 functions as a pressure reducing means for reducing the pressure of the refrigerant from the condenser 26. The refrigerant at a reduced pressure at the expansion valve 27 is subjected to an evaporation in the evaporator 8 located in the air passageway 1a in FIG. 1. Due to the latent heat of the evaporation, the air flow in the air passageway 1a contacting the evaporator 8 is subjected to cooling.

In FIG. 2, an electromagnetic valve 28 is arranged in the refrigerant recirculating passageway at a location downstream from the expansion valve 27 and upstream of the inlet 8a of the evaporator 8, while the valve 28 is located outside the cabin. A check valve 29 is arranged on the refrigerant recirculating passageway at a location downstream from the outlet 8b of the evaporator 8, so that a reverse flow of the refrigerant to the evaporator 8 is prevented. The electromagnetic valve 28 is of a type which is normally closed. Thus, during the stoppage of the air conditioning system, i.e., the compressor 26 is stopped due to the OFF condition of the electromagnetic clutch, the control circuit 23 deenergizes the electromagnetic valve 28. Furthermore, the check valve 29 includes a spring (not shown) which urges the valve member to take a closed condition. Thus, during the stoppage of the air conditioning system, the check valve 29 is in its closed position due to the spring force.

In a well known manner, the control circuit 23 is constructed by a microcomputer including various units such as a central processing unit (CPU), a read only memory (ROM) and a random access memory (RAM). Furthermore, as shown in FIG. 1, a pressure sensor 22, a start switch 30 for the air conditioning system and an ignition switch 33 are connected to the microcomputer, so that the signals from the sensor are input to the microcomputer. Based on signals from the sensors, the control circuit 23 executes a routine for operating the drive means 6, 12, 19 and 20, the blower motor 7b, the warning means 24 and the electro-magnetic valve 28. Finally, the air conditioning system start switch 30 is not made ON, as long as the switch (not shown) for the blower 7 is not in a condition for generating an air flow.

Figure 3:
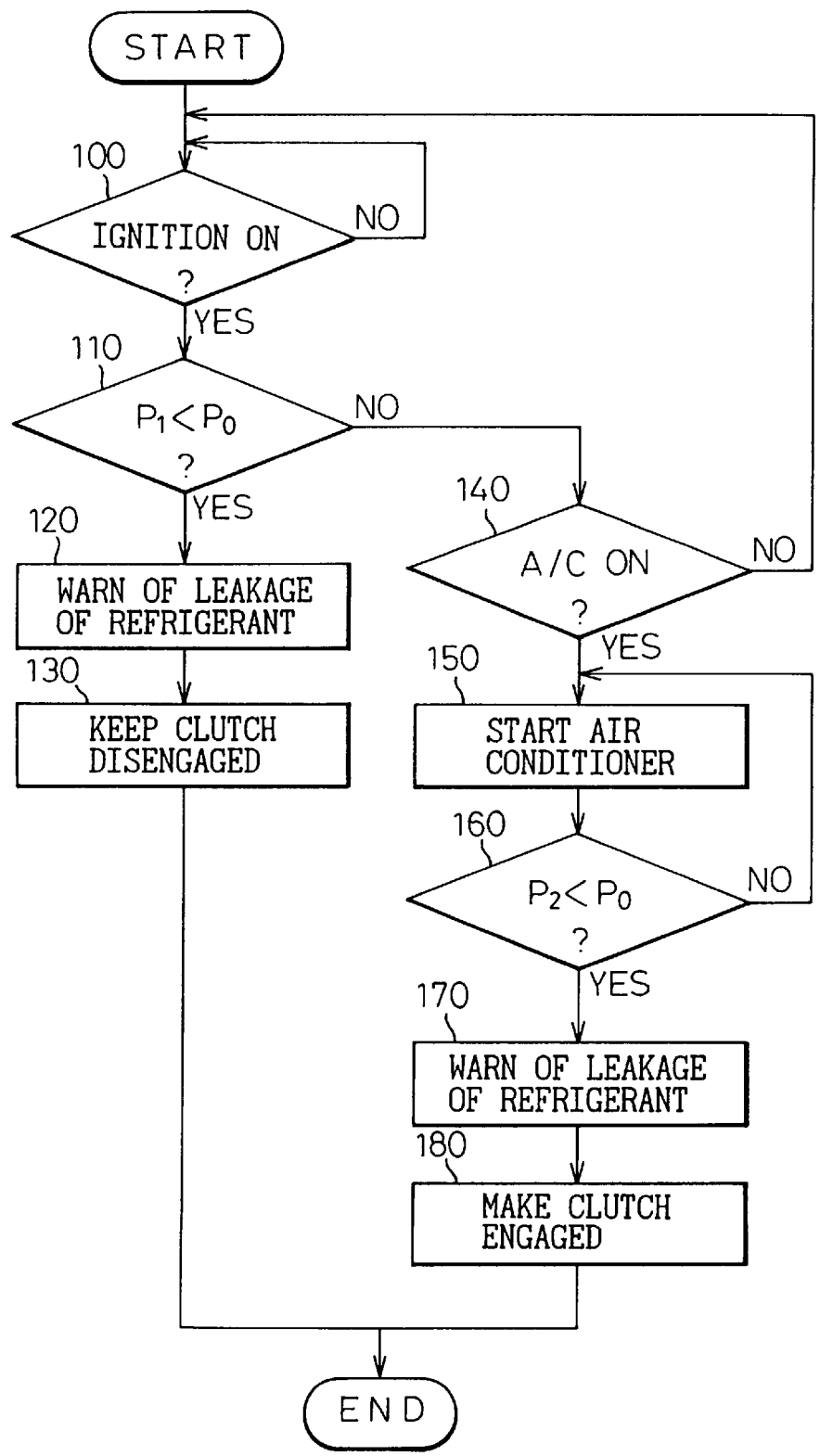
FIG. 3 is a flow chart illustrating an operation of the system in FIG. 1.
Figure 4:
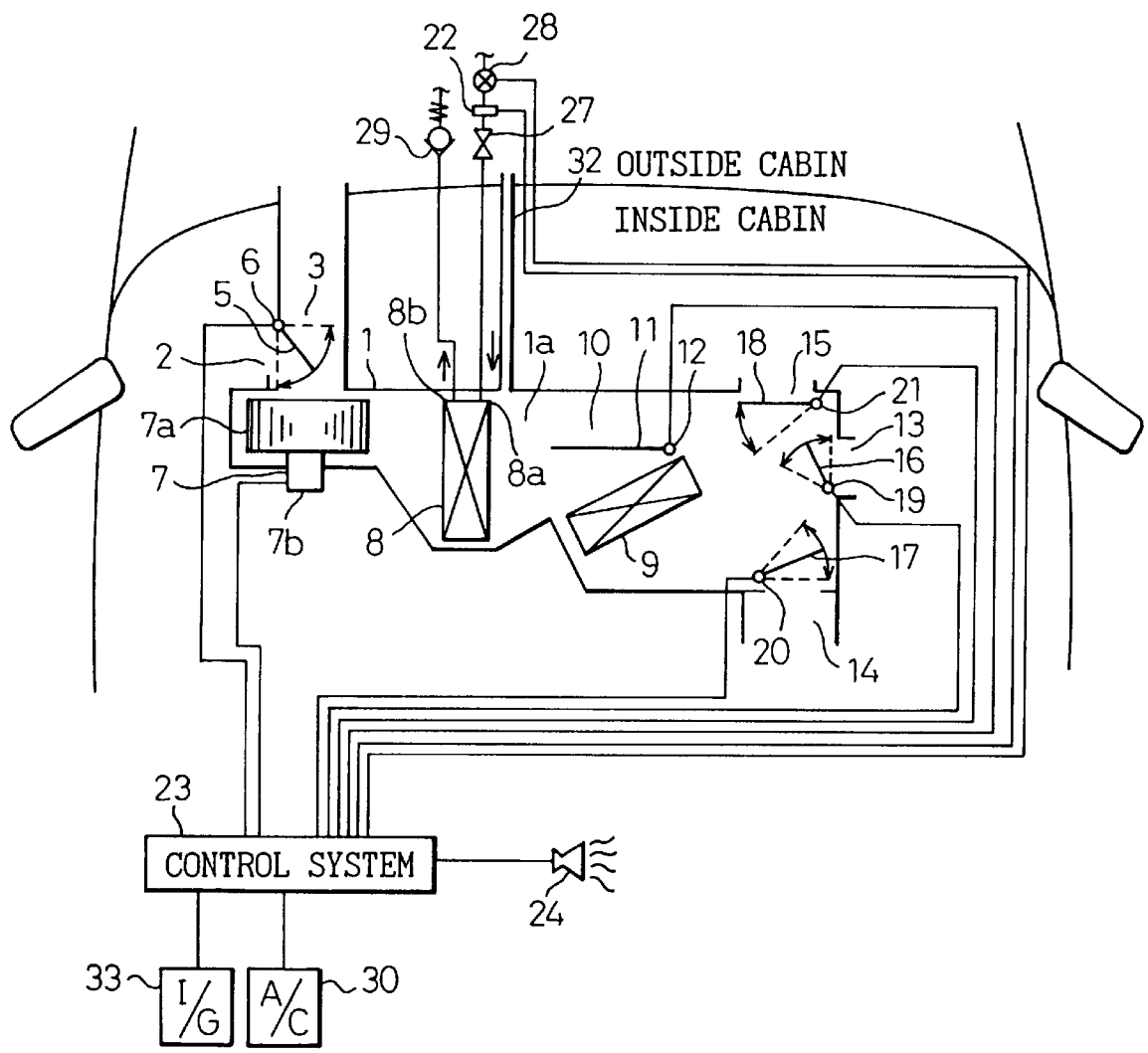
FIG. 4 is similar to FIG. 1 but shows a modification according to present invention.

Now, an operation of the control device 23 will be explained with reference to the flow chart in FIG. 3.

At a step 100, it is determined if the ignition key switch 33 is made ON by a passenger in the vehicle. If the ignition switch is on at step 100, the routine goes to step 110, where it is determined if the pressure P1 of the refrigerant sensed by the pressure sensor 22 at the inlet of the evaporator 8 is smaller than a predetermined value P0. If it is determined that the detected pressure P1 is smaller than the predetermined value P0, this indicates that a leakage of the refrigerant has occurred in the evaporator 8. In this case, the routine goes to step 120, where a warning by the warning means 24 is issued, i.e., a warning lamp is lit. Then, the routine goes to a step 130, where a disengaged condition of the electromagnetic clutch (not shown) is maintained, which causes the compressor 26 to be stopped.

If it is determined that the detected pressure P1 is equal to or larger than the predetermined value P0, this indicates that no leakage of the refrigerant has occurred at the evaporator 8. In this case, the routine goes to step 140, where it is determined if the air conditioning switch is made ON. If it is determined that the air conditioning switch is made ON, the routine flows to step 150, where the electoro-magnetic valve 28 is opened and the electromagnetic clutch on the crankshaft of the internal combustion engine (not shown) is engaged, which causes the air conditioning system to be brought into an operation. Then, the routine goes to step 160, where it is determined if the pressure P2 detected by the pressure sensor 22 is smaller that a predetermined value P0. If it is determined that the detected pressure P2 is smaller than the predetermined value P0, this indicates that a leakage of the refrigerant has occurred in the evaporator 8. In this case, the routine goes to step 170, where a warning by the warning means 24 is issued. Then, the routine flows into a step 180, where the electromagnetic clutch is disengaged, which causes the compressor 26 to be stopped.

In the above operation, if it is determined that the pressure P2 is smaller than P0 at the step 160, it is determined that a leakage of the refrigerant has occurred at a location of the refrigerating system other than the evaporator 8, since it was determined that the pressure P1 is equal to or larger than P0 at the preceding step 110, i.e., it was determined that no leakage of the refrigerant has occurred in the evaporator 8.

The advantageous effects of this embodiment are as follows. First, in the operation according to present invention, due to the closure of the electromagnetic valve 28 and the check valve 29, the refrigerant in the parts of the refrigerating system in the cabin including the evaporator 8 is brought to a confined state. Furthermore, a determination that a leakage of the refrigerant has occurred is done by determining the pressure of the refrigerant under the confined state. As a result, a positive and quick determination of a leakage of the refrigerant in the parts located in the cabin is realized.

Furthermore, during a stoppage of the air conditioning system for the vehicle, the compressor 25 is maintained in the stopped state. Thus, the air conditioning system is prevented from being erroneously operated when the refrigerant is leaking. Thus, an increase in the leaked amount of the refrigerant is prevented.

In a different embodiment, instead of arranging the electromagnetic valve 28 at a location downstream from the expansion valve 27, the electromagnetic valve 28 can be arranged at a location upstream from the expansion valve 27. In this case, the pressure sensor 22 may also be arranged at a location upstream from the expansion valve 27. As a result of this arrangement, the pressure sensor 22 detects the condensing pressure during the operation of the air conditioning system for the vehicle. The pressure sensor 22 detects the pressure in the evaporator 8 during the stoppage of the air conditioning system. Thus, this embodiment is advantageous in that the high pressure side switch 31 can be eliminated.

In place of the check valve 29, a electromagnetic valve, which is operated in cooperation with the electromagnetic valve 28, can be used.

Furthermore, in place of the pressure sensor 22, a pressure switch of the same type as that of the high pressure side switch 31 can be used. In this modification, unlike the pressure sensor 22, the switch does not need to be fed with an electric power, which is advantageous in that a detection of the leakage of the refrigerant can be positively done without being interrupted, which makes the pressure detection to be more reliable. It is desirable that such a pressure switch arranged at a location upstream from the expansion is constructed as a dual type pressure switch, which is per se known.

In the above embodiments, the predetermined value $P_0$ may be determined by considering a pressure change due to a change in the temperature of the refrigerant. As an alternative, a temperature sensor for detecting the temperature of the refrigerant at a location where a detection of the pressure of the refrigerant by the pressure sensor is executed and the detected temperature is used for correcting the predetermined value $P_0$ of the refrigerant.

Furthermore, the stoppage of the compressor 25 causes the refrigerant to be almost blocked at the compressor 25. As a result, a provision of the check valve 29 (the second valve means) can be eliminated.

Furthermore, an application of the present invention is not necessarily limited to an application in an air conditioning system for a vehicle. Namely, the present invention is applicable to an air conditioning system for use in a building.

Furthermore, in the illustrated embodiment, the evaporator 8 is arranged in a cabin. However, the present invention can be applicable to a construction where an evaporator 8 is arranged outside the cabin.

Furthermore, in the illustrated embodiment, as for a heat exchanger in which a refrigerant is passed, only the evaporator 8 is arranged in the casing 1 of the air conditioner. However, in an air conditioning system where, in place of a heater core 9, a condenser is used, the idea of the present invention is applicable to such a condenser.

Finally, as for a refrigerant, ammonia can be used.

We claim:

1. An air conditioning system, using as a refrigerant a liquid which may harm a human body, said system comprising:

a casing forming an air passageway for flow of air to a chamber to be subjected to air conditioning;

a refrigerant system comprising a compressor for compressing the refrigerant, a condenser for condensing the refrigerant from the compressor, a pressure reducing means for reducing the pressure of the refrigerant from the condenser, an evaporator located in said casing for evaporating the refrigerant from the pressure reducing means, and a refrigerant passageway for connecting these elements in line, respectively;

first valve means which closes the refrigerant passageway at a location upstream from the inlet of the refrigerant to the evaporator during a stoppage of the compressor;

second valve means which closes the refrigerant passageway at a location downstream from the outlet of the evaporator during a stoppage of the compressor, said first and second valve means isolating refrigerant in said evaporator from refrigerant in said compressor and said condenser;

pressure detecting means for detecting the pressure of the refrigerant, arranged in the refrigerant passageway at a location between said first and second valve means; and determining means for determining that a leakage of the refrigerant has occurred at a location of the refrigerant passageway between said first valve means and said second valve means when the detected pressure valve of the detecting means is smaller than a predetermined valve.

2. An air conditioning system, according to claim 1, wherein the compressor is brought into a stopped condition when the pressure sensed by the pressure detecting means is smaller than a predetermined value.

3. An air conditioning system, according to claim 1, wherein said pressure detecting means comprise a pressure switch having contacts which are selectively operated by mechanically detecting the pressure of the refrigerant.

4. An air conditioning system, according to claim 1, wherein said first valve mwans is arranged at a location downstream from said pressure reducing means and said second valve means is arranged at a location upstream from said compressor.

5. An air conditioning system, according to claim 1, wherein said determining means determines occurrence of a leakage of the refrigerant at a portion of the passageway between said first valve means and said second valve means, when the detected pressure value before said compressor starts driving is smaller than the predetermined value, and occurrence of a leakage of the refrigerant at a remaining portion of the passageway except for the portion of the passageway between said first valve means and said second valve means, when the detected pressure value after said compressor drives is smaller than the predetermined value.

6. An air conditioning system, using as a refrigerant a liquid which may harm a human body, said system comprising:

a casing forming an air passageway for flow of air to a chamber to be subjected to air conditioning;

a refrigerant system comprising a compressor for compressing the refrigerant, a condensor for condensing the refrigerant from the compressor, a pressure reducing means for reducing the pressure of the refrigerant from the condenser, an evaporator located in said casing for evaporating the refrigerant from the pressure reducing means, and a refrigerant passageway for connecting these elements in line, respectively;

first valve means which closes the refrigerant passageway at a location between said condenser and said evaporator during a stoppage of the compressor;

second valve means which closes the refrigerant passageway at a location between said compressor and said evaporator during a stoppage of the compressor, said first and second valve means isolating refrigerant in said evaporator from refrigerant in said compressor and said condenser;

pressure detecting means for detecting the pressure of the refrigerant, arranged in the refrigerant passageway at a location between said first and second valve means; and determining means for determining that a leakage of the refrigerant has occurred at a location of the refrigerant passageway between said first valve means and said second valve means when the detected pressure valve of the detecting means is smaller than a predetermined valve.

* * * * *

UNITED STATES PATENT AND TRADEMARK OFFICE
CERTIFICATE OF CORRECTION

PATENT NO. : 5,983,657
DATED : November 16, 1999
INVENTOR(S) : Yoshinori Murata et al It is certified that error appears in the above-identified patent and that said Letters Patent is hereby corrected as shown below:

Col. 5, line 31, delete "electoro-" and substitute --electro-- therefor
Col. 5, line 37, delete "that" and substitute --than-- therefor
Col. 5, line 54, after "to" insert --the--
Col. 6, line 16, delete "a" and substitute --an-- therefor
Col. 7, line 23, claim 1, delete "valve" and substitute --value-- therefor
Col. 7, line 25, claim 1, delete "valve" and substitute --value-- therefor
Col. 7, line 35, claim 4, delete "mwans" and substitute --means-- therefor
Col. 8, line 38, claim 6, delete "valve" and substitute --value-- therefor
Col. 8, line 40, claim 6, delete "valve" and substitute --value-- therefor Signed and Sealed this Fifth Day of December, 2000

*Attest:*

Q. TODD DICKINSON

*Attesting Officer*           *Director of Patents and Trademarks*